US009972873B2

(12) United States Patent
Chung et al.

(10) Patent No.: US 9,972,873 B2
(45) Date of Patent: May 15, 2018

(54) BATTERY PACK HAVING NOVEL COOLING STRUCTURE

(71) Applicant: LG CHEM, LTD., Seoul (KR)

(72) Inventors: Chae Ho Chung, Daejeon (KR); JiYoung Choi, Yongin-si (KR); JaeHun Yang, Daejeon (KR); SangYoon Jeong, Daejeon (KR); WonChan Park, Daejeon (KR); YongSeok Choi, Daejeon (KR); YoungHo Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 267 days.

(21) Appl. No.: 14/194,896

(22) Filed: Mar. 3, 2014

(65) Prior Publication Data

US 2014/0178721 A1 Jun. 26, 2014

Related U.S. Application Data

(63) Continuation of application No. PCT/KR2012/007520, filed on Sep. 20, 2012.

(30) Foreign Application Priority Data

Sep. 29, 2011 (KR) ........................ 10-2011-0098659

(51) Int. Cl.
*H01M 10/667* (2014.01)
*H01M 10/6563* (2014.01)
(Continued)

(52) U.S. Cl.
CPC ..... *H01M 10/5067* (2013.01); *H01M 2/1077* (2013.01); *H01M 10/425* (2013.01);
(Continued)

(58) Field of Classification Search
CPC ............. H01M 10/613; H01M 10/647; H01M 10/663; H01M 10/625; H01M 10/6563;
(Continued)

(56) References Cited

U.S. PATENT DOCUMENTS 5,937,664 A * 8/1999 Matsuno ............ B60H 1/00278 62/186
6,094,927 A 8/2000 Anazawa et al.
(Continued)

FOREIGN PATENT DOCUMENTS

CN 101622733 A 1/2010
JP 2006-128123 A 5/2006
(Continued)

OTHER PUBLICATIONS

International Search Report issued in PCT/KR2012/007520, dated Feb. 28, 2013.

*Primary Examiner* — Ula C Ruddock
*Assistant Examiner* — Thomas H Parsons
(74) *Attorney, Agent, or Firm* — Birch, Stewart, Kolasch & Birch, LLP

(57) ABSTRACT

A battery pack including battery cells or unit modules (unit cells), configured to have a structure including a battery module group including one or more battery modules each having the unit cells mounted in a pack case in a state in which the unit cells are uprightly arranged in a width direction of the pack such that the unit cells are spaced apart by a spacing distance for coolant flow, a coolant introduction part continuously defined in a space between a bottom of the pack case and the battery module group, a coolant discharge part defined between a top of the pack case and the battery module group, an electronic member located at one side of the module group, the electronic member being mounted in an inner space defined by the coolant discharge part, and a (Continued)

coolant flow channel defined between the coolant introduction part and the coolant discharge part.

24 Claims, 8 Drawing Sheets

(51) Int. Cl.

| | |
|---|---|
| ***H01M 2/10*** | (2006.01) |
| ***H01M 10/42*** | (2006.01) |
| ***H01M 10/625*** | (2014.01) |
| ***H01M 10/6565*** | (2014.01) |
| ***H01M 10/613*** | (2014.01) |
| *H01M 10/663* | (2014.01) |
| *H01M 10/647* | (2014.01) |

(52) U.S. Cl.
CPC ....... *H01M 10/613* (2015.04); *H01M 10/625* (2015.04); *H01M 10/6563* (2015.04); *H01M 10/6565* (2015.04); *H01M 10/667* (2015.04); *H01M 10/647* (2015.04); *H01M 10/663* (2015.04); *H01M 2010/4271* (2013.01); *H01M 2220/20* (2013.01)

(58) Field of Classification Search
CPC ........... H01M 10/6565; H01M 10/667; H01M 10/425; H01M 1/1077
See application file for complete search history.

(56) References Cited

U.S. PATENT DOCUMENTS

| | | | | |
|---|---|---|---|---|
| 2006/0093901 | A1 | 5/2006 | Lee et al. | |
| 2006/0115716 | A1* | 6/2006 | Kim .................. | H01M 10/4207 429/120 |
| 2006/0169507 | A1 | 8/2006 | Inoue et al. | |
| 2009/0305124 | A1 | 12/2009 | Ahn et al. | |
| 2010/0203376 | A1 | 8/2010 | Choi et al. | |
| 2011/0070474 | A1 | 3/2011 | Lee et al. | |
| 2011/0074717 | A1 | 3/2011 | Yamashita | |
| 2011/0177367 | A1 | 7/2011 | Chung et al. | |
| 2012/0088131 | A1 | 4/2012 | Chung et al. | |

FOREIGN PATENT DOCUMENTS

| | | | |
|---|---|---|---|
| JP | 2006-216303 | A | 8/2006 |
| JP | 2006-278140 | A | 10/2006 |
| JP | 2006278140 | * | 10/2006 |
| JP | 2007-234371 | A | 9/2007 |
| JP | 2007-250515 | A | 9/2007 |
| JP | 2008-254627 | A | 10/2008 |
| JP | 2008254627 | * | 10/2008 |
| JP | 2008311016 | * | 12/2008 |
| JP | 2009289636 | * | 12/2009 |
| JP | 2010-33799 | A | 2/2010 |
| JP | 4592469 | B2 | 12/2010 |
| JP | 2011-70474 | A | 4/2011 |
| JP | 2011-119102 | A | 6/2011 |
| KR | 10-2007-0099066 | A | 10/2007 |
| KR | 10-2010-0012018 | A | 2/2010 |
| KR | 10-2010-0098312 | A | 9/2010 |
| WO | WO 2010/098598 | A2 | 9/2010 |

* cited by examiner

【FIG. 1】
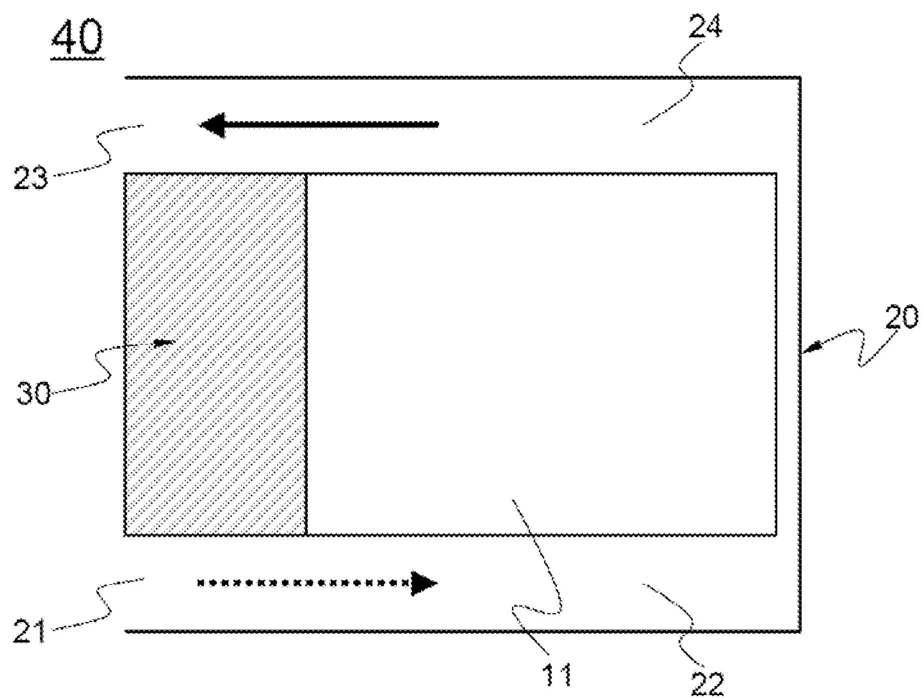

【FIG. 2】
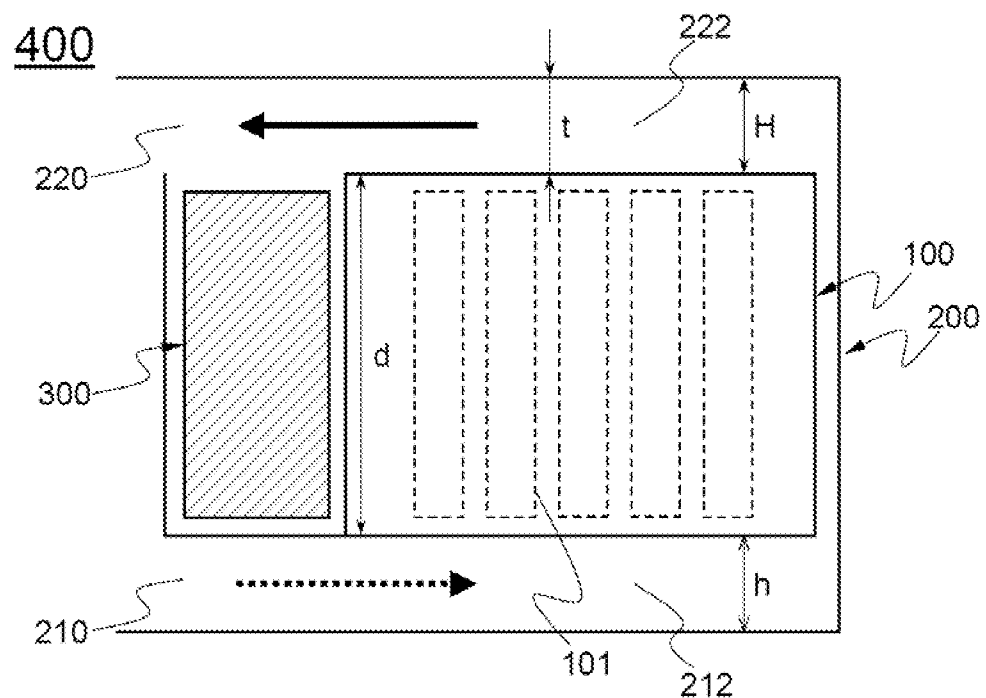

【FIG. 3】
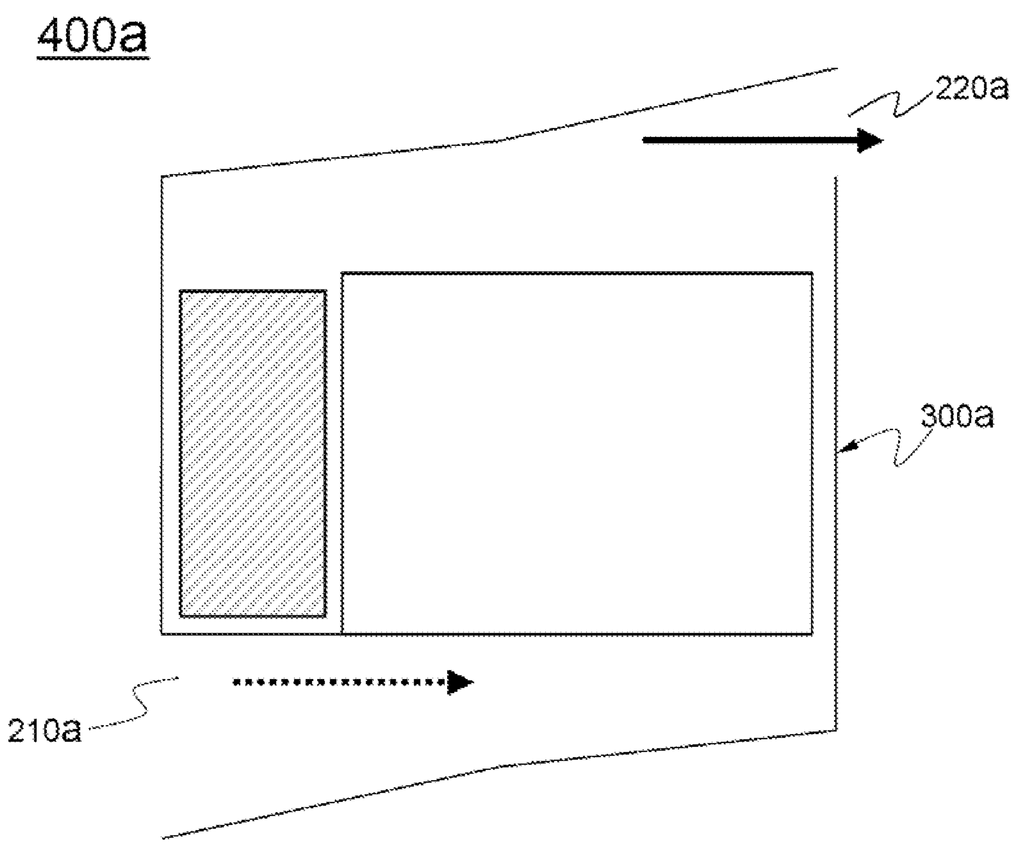

【FIG. 4】
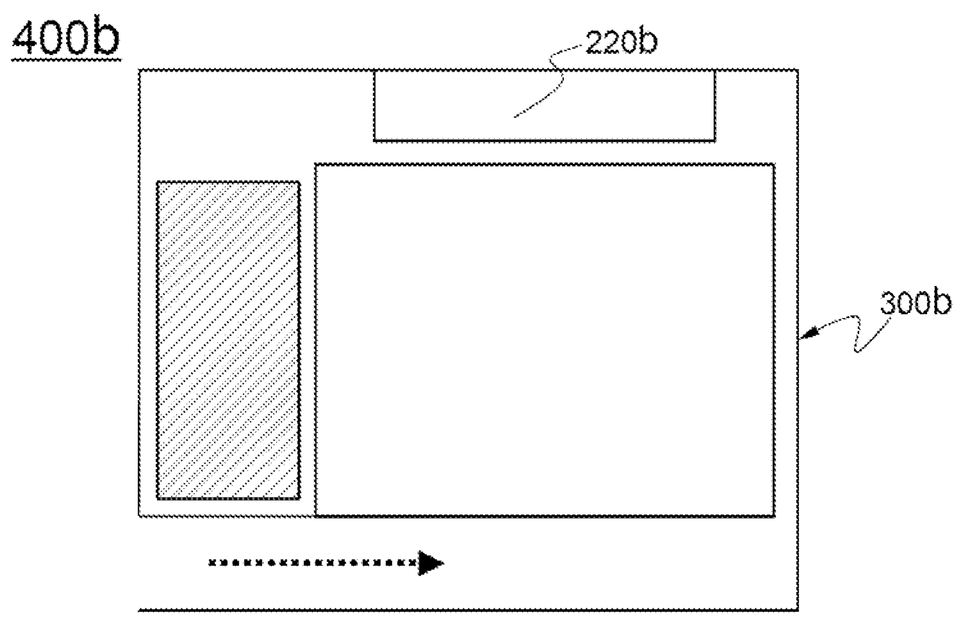

【FIG. 5】
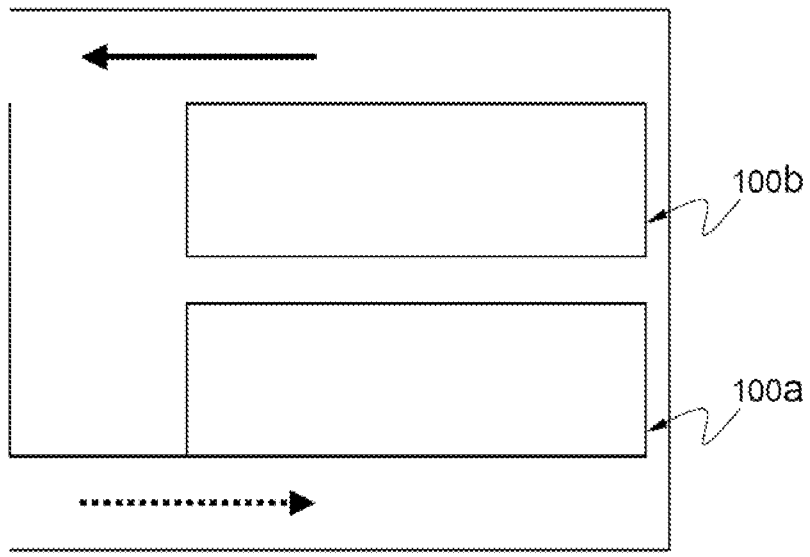

[FIG. 6]
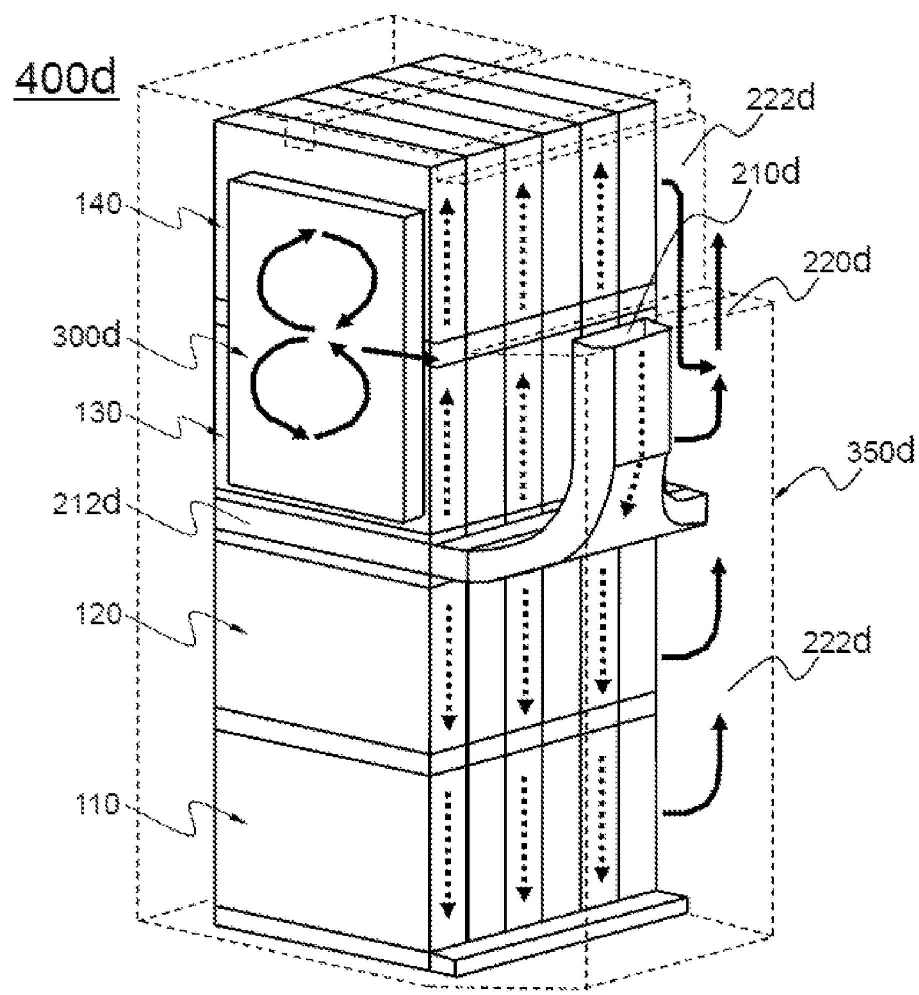

【FIG. 7】
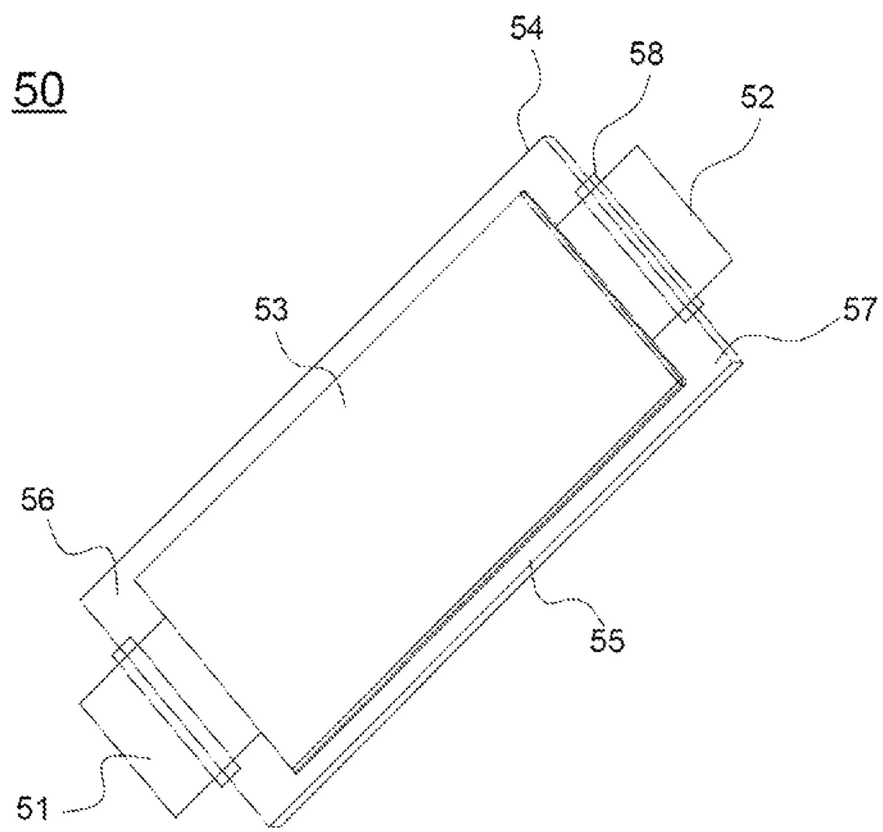

【FIG. 8】
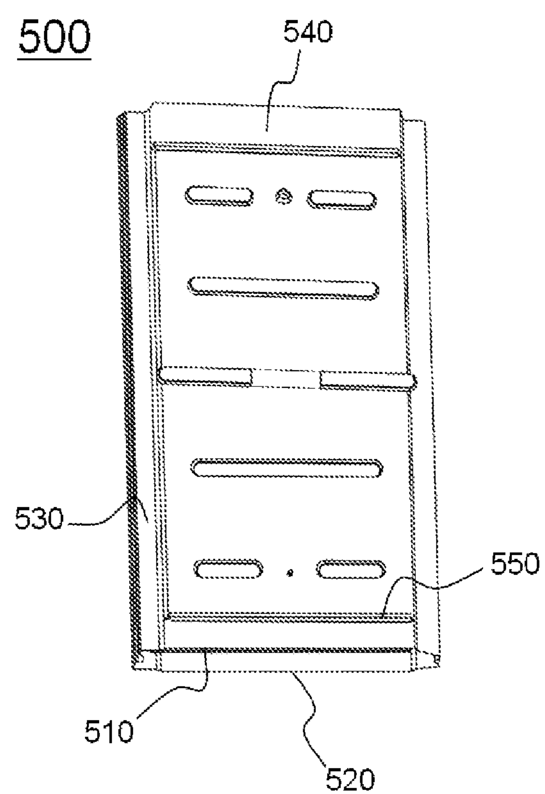

BATTERY PACK HAVING NOVEL COOLING STRUCTURE

CROSS REFERENCE TO RELATED APPLICATIONS

This application is a Bypass Continuation of PCT International Application No. PCT/KR2012/007520 filed on Sep. 20, 2012, which claims priority under 35 U.S.C § 119(a) to Patent Application No. 10-2011-0098659 filed in the Republic of Korea on Sep. 29, 2011, all of which are hereby expressly incorporated by reference into the present application.

TECHNICAL FIELD

The present invention relates to a battery pack including battery cells or unit cells that can be charged and discharged, wherein the battery pack is configured to have a structure including a battery module group including one or more battery modules each having the unit cells mounted in a pack case in a state in which the unit cells are uprightly arranged in a lateral direction of the battery pack such that the unit cells are spaced apart from each other by a spacing distance for coolant flow, a coolant introduction part, as a flow space extending from a coolant inlet port to the battery module group, continuously defined in a space between a bottom of the pack case and the battery module group, a coolant discharge part, as a flow space extending from the battery module group to a coolant outlet port, defined in a space between a top of the pack case and the battery module group, an electronic member located at one side of the battery module group, the electronic member being mounted in an inner space defined by the coolant discharge part, and a coolant flow channel defined between the coolant introduction part and the coolant discharge part, the coolant flow channel being configured such that coolant introduced through the coolant inlet port cools the respective unit cells while passing through the respective unit cells and some of the coolant having passed through the respective unit cells cools the electronic member in an eddy form and is then discharged out of the battery pack through the coolant outlet port.

BACKGROUND ART

Recently, a secondary battery, which can be charged and discharged, has been widely used as an energy source for wireless mobile devices. In addition, the secondary battery has attracted considerable attention as a power source for electric vehicles (EV) and hybrid electric vehicles (HEV), which have been developed to solve problems, such as air pollution, caused by existing gasoline and diesel vehicles using fossil fuels.

Small-sized mobile devices use one or several battery cells per device. On the other hand, middle or large-sized devices, such as vehicles, use a middle or large-sized battery module having a plurality of battery cells electrically connected to one another because high power and large capacity are necessary for the middle or large-sized devices.

Preferably, the middle or large-sized battery module is manufactured so as to have as small a size and weight as possible. For this reason, a prismatic battery or a pouch-shaped battery, which can be stacked with high integration and has a small weight to capacity ratio, is usually used as a battery cell of the middle or large-sized battery module. In particular, much interest is currently focused on the pouch-shaped battery, which uses an aluminum laminate sheet as a sheathing member, because the pouch-shaped battery is lightweight, the manufacturing costs of the pouch-shaped battery are low, and it is possible to easily modify the shape of the pouch-shaped battery.

In order for the middle or large-sized battery module to provide power and capacity required by a specific apparatus or device, it is necessary for the middle or large-sized battery module to be configured to have a structure in which a plurality of battery cells is electrically connected in series to each other or in series and parallel to each other and the battery cells are stable against external force.

Meanwhile, the battery cells constituting the middle or large-sized battery module may be secondary batteries which can be charged and discharged. Consequently, a large amount of heat is generated from such high-power, large-capacity secondary batteries during charge and discharge of the secondary batteries. If the heat, generated from the unit battery during charge and discharge of the unit battery, is not effectively removed from the unit battery, the heat accumulates in the unit battery with the result that deterioration of the unit battery is accelerated. According to circumstances, the unit battery may catch fire or explode. For this reason, a battery pack for vehicles, which is a high-power, large-capacity battery, needs a cooling system to cool battery cells mounted in the battery pack.

In a middle or large-sized battery pack including a plurality of battery cells, on the other hand, the deterioration in performance of some battery cells leads to the deterioration in performance of the entire battery pack. One of the main factors causing the non-uniformity in performance is the non-uniformity of cooling between the battery cells. For this reason, it is necessary to provide a structure to secure cooling uniformity during the flow of a coolant.

FIG. 1 is a vertical sectional view typically showing a conventional middle or large-sized battery pack. Referring to FIG. 1, a battery pack 40 is configured to have a structure including a battery module group 11, an electronic member 30 mounted to one side of the battery module group 11, specifically to the left side of the battery module group 11 on the drawing, and a pack case 20, in which the battery module group 11 and the electronic member 30 are mounted.

A coolant introduction part 22 is defined below the battery module group 11 and a coolant discharge part 24 is defined above the battery module group 11. A coolant, introduced into the coolant introduction part 22 through a coolant inlet port 21 as indicated by an arrow, sequentially passes through the battery module group 11 and the coolant discharge part 24 while cooling unit cells of the battery module group 11 and is then discharged out of the battery pack through a coolant outlet port 23 as indicated by another arrow. Although not shown, a coolant flow channel is defined between the respective unit cells, which are vertically stacked, of the battery module group 11.

In the above structure, however, a space of the coolant flow channel is limited and, therefore, differential pressure is generated. As a result, it is difficult to achieve uniform cooling between the battery cells. In addition, since the coolant discharge part 24 and the coolant outlet port 23 constitute a continuous duct structure, the coolant having passed through the battery module group 11 is discharged out of the battery pack without being circulated in the battery pack except the interior of each battery module. As a result, it is difficult to cool heat generating elements, such as a battery management system (BMS) and a bus bar, except the battery cells.

Consequently, there is a high necessity for technology to fundamentally solve the above problems.

DISCLOSURE

Technical Problem

Therefore, the present invention has been made to solve the above problems and other technical problems that have yet to be resolved.

It is an object of the present invention to provide a battery pack that is capable of circulating a coolant in the battery pack, thereby improving cooling efficiency of an electronic member for the battery pack or a vehicle as well as unit cells.

It is another object of the present invention to provide a battery pack configured to have a structure in which a coolant flow channel is easily changed according to the structure of a device to which the battery pack is applied, whereby flexibility in design is improved.

Technical Solution

In accordance with one aspect of the present invention, the above and other objects can be accomplished by the provision of a battery pack including battery cells or unit modules (unit cells) that can be charged and discharged, wherein the battery pack is configured to have a structure including a battery module group including one or more battery modules each having the unit cells mounted in a pack case in a state in which the unit cells are uprightly arranged in a width direction (lateral direction) of the battery pack such that the unit cells are spaced apart from each other by a spacing distance for coolant flow, a coolant introduction part, as a flow space extending from a coolant inlet port to the battery module group, continuously defined in a space between a bottom of the pack case and the battery module group, a coolant discharge part, as a flow space extending from the battery module group to a coolant outlet port, defined in a space between a top of the pack case and the battery module group, an electronic member located at one side of the battery module group, the electronic member being mounted in an inner space defined by the coolant discharge part, and a coolant flow channel defined between the coolant introduction part and the coolant discharge part, the coolant flow channel being configured such that coolant introduced through the coolant inlet port cools the respective unit cells while passing through the respective unit cells and some of the coolant having passed through the respective unit cells cools the electronic member in an eddy form and is then discharged out of the battery pack through the coolant outlet port.

In the battery pack according to the present invention as described above, the coolant flow space is secured unlike the structure of a conventional battery pack. Consequently, it is possible to remove heat generated from the electronic member in the battery pack as well as the unit cells.

The coolant introduction part and the coolant discharge part may be configured to have various structures. For example, the coolant introduction part may be located below or above the battery module group and the coolant discharge part may be located above or below the battery module group such that the coolant discharge part corresponds to the coolant introduction part.

In a preferred example, the coolant inlet port and the coolant outlet port, through which the coolant to effectively remove heat from the battery cells due to charge and discharge of the battery cells is introduced and discharged, may be located at the same side or opposite sides of the pack case. That is, the coolant inlet port and the coolant outlet port may be located at the same side or opposite sides of the pack case based on a space of a vehicle in which the battery pack is mounted.

In another preferred example, the coolant outlet port may be directed to the front, the rear, or the top of the pack case based on a space of a vehicle in which the battery pack is mounted.

In addition, the coolant outlet port may be formed at the pack case in the shape of an opening such that the coolant from the coolant discharge part can be directly discharged out of the battery pack without an additional duct. That is, the pack case itself may function as a coolant discharge duct, thereby minimizing the manufacturing process and costs and maximizing inner space efficiency of the pack case. Consequently, it is possible to secure the coolant flow space, thereby reducing a difference pressure.

Meanwhile, the electronic member may be a heat generating element, such as a battery management system (BMS) or a bus bar, except the battery cells. Preferably, the electronic member is a BMS.

In an example, the amount of the coolant to cool the electronic member may be 5 to 50% the amount of coolant introduced into the battery pack per unit time.

If the amount of the coolant to cool the electronic member is too small, it is difficult to obtain a cooling effect of the electronic member, which is not preferable. On the other hand, if the amount of the coolant to cool the electronic member is too large, a cooling effect of the unit cells may be greatly lowered under a condition that the amount of the coolant is uniform, which is also not preferable.

In another example, the electronic member may be located at an angle of 20 to 70 degrees to a direction in which the coolant flows from the coolant introduction part to the unit cells such that the electronic member easily generates eddy coolant.

Preferably, at least one communication port for coolant flow is defined between the electronic member and a corresponding one of the unit cells. In this structure, the cooling efficiency of the electronic member is higher than a cooling structure having no communication port.

Meanwhile, the battery module group may include two or more battery modules and the battery modules may be vertically stacked in a height direction of the battery pack. That is, the battery modules may be continuously vertically arranged in a state in which coolant flow channels of the respective battery modules communicate with each other such that the coolant effectively removes heat generated from the battery cells, in a limited space, while moving along the coolant flow channels. Consequently, it is possible to enhance cooling efficiency and to improve operational performance of the unit cells.

Meanwhile, the battery pack may be configured to have a structure in which the top and the bottom of the battery module group may be spaced apart respectively from the top and the bottom of the pack case by a predetermined width to define the coolant flow channel therebetween. Consequently, the coolant, introduced from one side of the pack case, may uniformly cool the battery modules within a predetermined temperature deviation range while passing through the space.

In the above structure, the spacing width defined between the outside of the battery module group and the inside of the pack case may be set within a range in which it is possible to uniformly cool the battery modules within the predetermined temperature deviation range and, in addition, to appropriately adjust the overall size of the battery pack. For example, the spacing width may be equivalent to 5 to 50% the height of each battery module.

Meanwhile, the coolant introduction part may have a height equivalent to 20 to 90% the height of the coolant discharge part such that the coolant, introduced into the coolant introduction part, can sufficiently reach up to the battery cell far from the coolant introduction part. Consequently, it is possible to exhibit a relatively uniform coolant distribution effect under a condition that flow rate of the coolant is uniform.

According to circumstances, a driving fan to provide flow driving force to the coolant may be further mounted in the coolant inlet port such that the coolant, introduced from the coolant introduction part, rapidly and smoothly passes through the battery modules.

In another preferred example, the coolant inlet port may be connected to an air conditioner system of a vehicle such that cooled air, i.e. low-temperature air, is introduced through the coolant inlet port. Consequently, it is possible to much more efficiently cool the unit cells using the low-temperature air than in an air cooling type cooling structure using room-temperature air.

In the battery pack according to the present invention, the coolant introduction parts and the coolant discharge part may be configured to have various structures. Some preferred example thereof will hereinafter be described.

As a first example, the pack case may be configured to have a structure in which the top and/or the bottom of the pack case includes two or more continuous inclined surfaces to improve efficiency in coolant flow.

Specifically, the top of the pack case at the coolant discharge part may be configured to have a structure in which the distance between the top of the pack case and the top of the battery module group is decreased toward the end of the pack case opposite to the coolant outlet port.

In addition, the bottom of the pack case may be configured to have a structure in which the distance between the bottom of the pack case and the bottom of the battery module group is decreased toward the end of the pack case opposite to the coolant inlet port.

That is, the coolant, introduced through the coolant inlet port, reaches to the end opposite to the coolant inlet port while the flow speed of the coolant is gradually increased as the coolant flows along the continuous inclined surfaces. As a result, it is possible to uniformly cool all of the unit cells, i.e. the unit cells adjacent to the coolant inlet port and the unit cells far from the coolant inlet port.

Meanwhile, the number of the unit cells constituting each battery module may be changed depending upon a required driving output of a vehicle and a height limit of the vehicle. For example, each battery module may include 8 to 24 unit cells.

For reference, the term "battery module" used in the specification inclusively means the structure of a battery system configured to have a structure in which two or more chargeable and dischargeable battery cells or unit modules are mechanically fastened and, at the same time, electrically connected to each other to provide high power and large capacity. Therefore, the battery module itself may constitute a single apparatus or a part of a large-sized apparatus. For example, a large number of small-sized battery modules may be connected to each other to constitute a large-sized battery module. Alternatively, a small number of battery cells may be connected to each other to constitute a unit module, and a plurality of the unit modules may be connected to each other.

The unit cells may be spaced apart from each other by a size equivalent to 5 to 50% the thickness of each unit cell such that the coolant effectively cools the unit cells while passing between the unit cells.

For example, if the distance between the unit cells is less than 5% the thickness of each unit cell, it is difficult to achieve a desired coolant cooling effect, which is not preferable. On the other hand, if the distance between the unit cells is greater than 50% the thickness of each unit cell, the overall size of the battery module constituted by the unit cells is increased, which is also not preferable.

Meanwhile, each unit module may be configured to have a structure in which plate-shaped battery cells, each of which has electrode terminals formed at the upper end and the lower end thereof, are connected in series to each other. For example, each unit module may include two or more battery cells, the electrode terminals of which are connected in series to each other, and a pair of high-strength cell covers coupled to cover outsides of the battery cells excluding the electrode terminals of the battery cells.

Each of the plate-shaped battery cells is a battery cell having a small thickness and a relatively large width and length so as to minimize the overall size of a battery module when the battery cells are stacked to constitute the battery module. In a preferred example, each of the battery cells may be a secondary battery configured to have a structure in which an electrode assembly is mounted in a battery case formed of a laminate sheet including a resin layer and a metal layer and electrode terminals protrude from the upper and lower ends of the battery case. Specifically, the electrode assembly may be mounted in a pouch-shaped case formed of an aluminum laminate sheet. The secondary battery with the above-described structure may also be referred to as a pouch-shaped battery cell.

Each of the battery cells may be a secondary battery, such as a nickel metal hydride secondary battery or a lithium secondary battery. The lithium secondary battery is particularly preferable since the lithium secondary battery has high energy density and large discharge voltage.

In the present invention, the coolant is not particularly restricted so long as the coolant is a fluid to cool the battery cells. The coolant may be air or water. Preferably, the coolant is air. The coolant may be supplied by an additional device, such as a fan, and then introduced into the battery pack according to the present invention through the coolant inlet port. However, the device to drive the coolant is not limited to the fan.

In accordance with another aspect of the present invention, there is provided an electric vehicle, a hybrid electric vehicle, a plug-in hybrid electric vehicle, or a power storage device using the battery pack with the above-stated construction as a power source.

Particularly, in a case in which the battery pack is used in the electric vehicle, the hybrid electric vehicle, or the plug-in hybrid electric vehicle as the power source, the battery pack may be mounted in a trunk of the vehicle.

The electric vehicle, the hybrid electric vehicle, the plug-in hybrid electric vehicle, and the power storage device using the battery pack as the power source are well known in the art to which the present invention pertains and thus a detailed description thereof will be omitted.

DESCRIPTION OF DRAWINGS

The above and other objects, features and other advantages of the present invention will be more clearly understood from the following detailed description taken in conjunction with the accompanying drawings, in which:

FIG. 1 is a vertical sectional view of a conventional middle or large-sized battery pack;

FIGS. 2 to 5 are vertical sectional views showing embodiments of a battery pack according to the present invention;

FIG. 6 is a see-through view of a battery pack according to an embodiment of the present invention;

FIG. 7 is a perspective view of a pouch-shaped battery cell; and

FIG. 8 is a perspective view of a cell cover, in which the battery cell of FIG. 7 will be mounted to constitute a unit module.

BEST MODE

Now, preferred embodiments of the present invention will be described in detail with reference to the accompanying drawings. It should be noted, however, that the scope of the present invention is not limited by the illustrated embodiments.

FIG. 2 is a vertical sectional view typically showing an exemplary battery pack according to the present invention.

Referring to FIG. 2, a battery pack 400 is configured to have a structure including a battery module group 100, a battery management system (BMS) 300 mounted to one side of the battery module group 100, specifically to the left side of the battery module group 100 on the drawing, and a pack case 200, in which the battery module group 100 and the BMS 300 are mounted, in the same manner as in FIG. 1. The battery module group 100 includes a plurality of unit cells 101. The unit cells 101 are uprightly arranged in a width direction of the battery pack 400 such that the unit cells 101 are spaced apart from each other such that a coolant flows between the respective unit cells 101.

A coolant introduction part 212 is continuously defined in a space, below the battery module group 100, between the battery module group 100 and the pack case 200 and a coolant discharge part 222 is continuously defined in a space, above the battery module group 100, between the battery module group 100 and the pack case 200.

The coolant introduction part 212 is a flow space extending from a coolant inlet port 210 to the battery module group 100 and the coolant discharge part 222 is a flow space extending from the battery module group 100 to a coolant outlet port 220. The BMS 300 is mounted in an inner space defined by the coolant discharge part 222.

A coolant is introduced into the coolant introduction part 212 through the coolant inlet port 210 as indicated by an arrow. The coolant cools the respective unit cells 101 of the battery module group while passing through the battery module group 100. After passing through the respective unit cells 101, the coolant is discharged out of the battery pack through the coolant discharge part 222 and the coolant outlet port 220 as indicated by another arrow.

The coolant outlet port 220 is formed at the pack case in the shape of an opening (see FIG. 6) such that the coolant from the coolant discharge part 222 can be directly discharged out of the battery pack without an additional duct. Consequently, some of the coolant cools the BMS 300 in an eddy form and is then discharged out of the battery pack through the coolant outlet port 220.

The coolant introduction part 212 and the coolant discharge part 222 each have a spacing width t equivalent to about 30% a height d of each battery module and the coolant introduction part 212 has a height h equivalent to about 90% a height H of the coolant discharge part 222.

Between the BMS 300 and a corresponding one of the unit cells 101 may be defined a communication port (not shown), through which the coolant flows.

The coolant inlet port 210 may be connected to an air conditioner system (not shown) of a vehicle such that cooled air, i.e. low-temperature air, is introduced through the coolant inlet port 210, passes horizontally through the battery module group 100, and is discharged through the coolant outlet port 220. Consequently, it is possible to greatly improve cooling efficiency of the battery modules as compared with an air cooling type cooling system using room-temperature air.

Meanwhile, the amount of coolant used to cool the BMS 300 is about 30% the amount of coolant introduced into the battery pack 400 per unit time. In order to generate eddy coolant, the BMS 300 is located at an angle of about 50 degrees to the direction in which the coolant flows from the coolant introduction part 212 to the unit cells 101. After the coolant is introduced into the battery module group 100, therefore, the coolant is also introduced into the BMS. As a result, the BMS is easily cooled.

FIG. 3 is a vertical sectional view typically showing another exemplary battery pack according to the present invention.

Referring to FIG. 3 together with FIG. 2, a coolant inlet port 210*a* and a coolant outlet port 220*a* of a battery pack 400*a* are located at opposite sides of a pack case 300*a*. The top and the bottom of the pack case 300*a* include continuous inclined surfaces. The other configuration of the battery pack is identical to that of the battery pack described with reference to FIG. 2 and, therefore, a detailed description thereof will be omitted.

FIG. 4 is a vertical sectional view typically showing another exemplary battery pack according to the present invention.

Referring to FIG. 4 together with FIG. 2, a coolant outlet port 220*b* is directed to the top of a pack case 300*b*. The other configuration of the battery pack is identical to that of the battery pack described with reference to FIG. 2 and, therefore, a detailed description thereof will be omitted.

FIG. 5 is a vertical sectional view typically showing another exemplary battery pack according to the present invention.

Referring to FIG. 5 together with FIG. 2, battery module groups 100*a* and 100*b* are continuously vertically arranged in a state in which coolant flow channels of the battery module groups communicate with each other in the height direction of a battery pack 400*c*. The other configuration of the battery pack is identical to that of the battery pack described with reference to FIG. 2 and, therefore, a detailed description thereof will be omitted.

FIG. 6 is a see-through view typically showing a further exemplary battery pack according to the present invention.

Referring to FIG. 6, a battery pack 400*d* is configured to have a structure including battery module groups 110, 120, 130, and 140 vertically stacked in the height direction in a state in which coolant flow channels of the battery module groups communicate with one another, a BMS 300*d* mounted at one side of the battery module groups 130 and 140, a coolant introduction part 212*d*, as an independent structure, disposed between the battery module group 120 and the battery module group 130, a coolant inlet port 210*d* communicating with the coolant introduction part 212*d*, a pack case 350*d*, in which all of the components as mentioned above are mounted, and a coolant outlet port 220*d*, as an opening formed at the pack case 350*d*, through which coolant, having passed through the battery module groups

110, 120, 130, and 140, is discharged out of the battery pack. In FIG. 6, the coolant inlet port 210*d* and the coolant outlet port 220*d* are formed at the right side of the pack case 350*d* side by side such that the coolant inlet port 210*d* and the coolant outlet port 220*d* are located at a height corresponding to the height of the battery module group 130.

A coolant discharge part 222*d* is defined in a space between the battery module groups 110, 120, 130, and 140 and the pack case 350*d*. The coolant discharge part 222*d* communicates with the coolant outlet port 220*d*. The BMS 300*d* is located in the coolant discharge part 222*d*.

In the same manner as in FIG. 2, a coolant, introduced through the coolant inlet port 210*d*, is introduced into the coolant introduction part 212*d* and moves upward and downward as indicated by dotted-line arrows. At this time, the coolant cools the battery module groups 110, 120, 130, and 140 while passing through the battery module groups 110, 120, 130, and 140.

Subsequently, the coolant cools the BMS 300*d* located in the coolant discharge part 222*d* in an eddy form and is discharged out of the battery pack through the coolant outlet port 220*d* as indicated by solid arrows.

According to circumstances, the coolant introduction part 212*d* may also include a space defined between the battery module groups 110, 120, 130, and 140 and the pack case 350*d* so as to directly communicate with the independent structure as described above in addition to the space defined as the independent structure. In this case, the BMS 300*d* may be located in an area where the coolant introduction part 212*d* and the coolant discharge part 222*d* coexist.

FIG. 7 is a perspective view typically showing a pouch-shaped battery cell.

Referring to FIG. 7, a pouch-shaped battery cell 50 is configured to have a structure in which two electrode leads 51 and 52 protrude respectively from the upper end and the lower end of a battery cell body 53 such that the electrode leads 51 and 52 are opposite to each other. A sheathing member 54 includes upper and lower sheathing parts. That is, the sheathing member 54 is a two-unit member. In a state in which an electrode assembly (not shown) is mounted in a receiving part which is defined between the upper and lower sheathing parts of the sheathing member 54, opposite sides 55, upper ends 56, and lower ends 57, which are contact regions of the upper and lower sheathing parts of the sheathing member 54, are bonded to each other, whereby the battery cell 50 is manufactured.

The sheathing member 54 is configured to have a laminate structure of a resin layer/a metal film layer/a resin layer. Consequently, it is possible to bond the opposite sides 55, the upper ends 56, and the lower ends 57 of the upper and lower sheathing parts of the sheathing member 54, which are in contact with each other, to each other by applying heat and pressure to the opposite sides 55, the upper ends 56, and the lower ends 57 of the upper and lower sheathing parts of the sheathing member 54 so as to weld the resin layers thereof to each other. According to circumstances, the opposite sides 55, the upper ends 56, and the lower ends 57 of the upper and lower sheathing parts of the sheathing member 54 may be bonded to each other using a bonding agent. For the opposite sides 55 of the sheathing member 54, the same resin layers of the upper and lower sheathing parts of the sheathing member 54 are in direct contact with each other, whereby uniform sealing at the opposite sides 55 of the sheathing member 54 is accomplished by welding. For the upper ends 56 and the lower ends 57 of the sheathing member 54, on the other hand, the electrode leads 51 and 52 protrude from the upper ends 56 and the lower ends 57 of the sheathing member 54, respectively. For this reason, the upper ends 56 and the lower ends 57 of the upper and lower sheathing parts of the sheathing member 54 are thermally welded to each other, in a state in which a film type sealing member 58 is interposed between the electrode terminals 51 and 52 and the sheathing member 54, in consideration of the thickness of the electrode leads 51 and 52 and the difference in material between the electrode leads 51 and 52 and the sheathing member 54, so as to increase sealability of the sheathing member 54.

FIG. 8 is a perspective view showing a cell cover, in which two battery cells, one of which is shown in FIG. 7, will be mounted to constitute a unit module.

Referring to FIG. 8, a cell cover 500 has two pouch-shaped battery cells (not shown), one of which is shown in FIG. 7, mounted therein. The cell cover 500 serves not only to increase mechanical strength of the battery cells but also to enable the battery cells to be easily mounted to a module case (not shown). The two battery cells are mounted in the cell cover 500 in a state in which one-side electrode terminals of the battery cells are connected in series to each other and bent in tight contact.

The cell cover 500 includes a pair of members 510 and 520 which are configured to be coupled to each other. The cell cover 500 is made of a high-strength metal sheet. Steps 530 to enable the module to be easily fixed are formed at left and right side edges of the cell cover 500 and steps 540 having the same function are also formed at the upper end and the lower end of the cell cover 500. In addition, fixing parts 550 are formed at the upper end and the lower end of the cell cover 500 such that the fixing parts 550 extend in the width direction of the cell cover 500. Consequently, the cell cover 500 is easily mounted to the module case (not shown).

As can be seen from the above embodiments, the battery pack may be configured to have a structure in which the coolant inlet port and the coolant outlet port are formed so as to correspond to the structure of a device to which the battery pack is applied. In addition, coolant is circulated in the battery pack, thereby improving cooling efficiency of the electronic member as well as the unit cells.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, the battery pack according to the present invention is configured to have a structure in which coolant is circulated in the battery pack such that the coolant is uniformly supplied to the electronic member as well as the unit cells.

In addition, the battery pack according to the present invention is configured to have a structure in which a coolant flow channel of the battery pack is easily changed according to the structure of a device to which the battery pack is applied, whereby flexibility in design is improved.

The invention claimed is:

1. A battery pack comprising battery cells or unit modules (unit cells) that can be charged and discharged, wherein the battery pack is configured to have a structure comprising:

a battery module group comprising one or more battery modules each having the unit cells mounted in a pack case in a state in which the unit cells are uprightly arranged in a width direction (lateral direction) of the battery pack such that the unit cells are spaced apart from each other by a spacing distance for coolant flow;

a coolant introduction part, as a flow space extending from a coolant inlet port to the battery module group, continuously defined in a space between a bottom of the pack case and the battery module group;

a coolant discharge part, as a flow space extending from the battery module group to a coolant outlet port, defined in a space between a top of the pack case and the battery module group;

an electronic member located at one side of the battery module group, the electronic member being mounted in an inner space defined by the coolant discharge part such that the coolant outlet port is located downstream from the electronic member; and a coolant flow channel defined between the coolant introduction part and the coolant discharge part, the coolant flow channel being configured such that coolant introduced through the coolant inlet port cools the respective unit cells while passing through the respective unit cells and some of the coolant having passed through the respective unit cells cools the electronic member in an eddy form and is then discharged out of the battery pack through the coolant outlet port, wherein the electronic member is located at an angle of 20 to 70 degrees to a direction in which the coolant flows from the coolant introduction part to the unit cells.

2. The battery pack according to claim 1, wherein the coolant introduction part is located below or above the battery module group, and the coolant discharge part is located above or below the battery module group such that the coolant discharge part corresponds to the coolant introduction part.

3. The battery pack according to claim 2, wherein the coolant inlet port and the coolant outlet port are located at the same side or opposite sides of the pack case.

4. The battery pack according to claim 2, wherein the coolant outlet port is directed to a front, a rear, or a top of the pack case.

5. The battery pack according to claim 4, wherein the coolant outlet port is formed at the pack case in the shape of an opening such that the coolant from the coolant discharge part can be directly discharged out of the battery pack without an additional duct.

6. The battery pack according to claim 1, wherein the electronic member is a battery management system (BMS).

7. The battery pack according to claim 1, wherein an amount of the coolant to cool the electronic member is 5 to 50% the amount of coolant introduced into the battery pack per unit time.

8. The battery pack according to claim 1, wherein the battery module group comprises two or more battery modules, and the battery modules are vertically stacked in a height direction of the battery pack.

9. The battery pack according to claim 1, wherein a top and a bottom of the battery module group are spaced apart respectively from the top and the bottom of the pack case by a predetermined width to define the coolant flow channel therebetween.

10. The battery pack according to claim 9, wherein the spacing width is equivalent to 5 to 50% a height of each battery module.

11. The battery pack according to claim 1, wherein the coolant introduction part has a height equivalent to 20 to 90% a height of the coolant discharge part.

12. The battery pack according to claim 1, wherein a driving fan to provide flow driving force to the coolant is further mounted in the coolant inlet port.

13. The battery pack according to claim 1, wherein the coolant inlet port is connected to an air conditioner system of a vehicle such that cooled air is introduced through the coolant inlet port.

14. The battery pack according to claim 1, wherein the pack case is configured to have a structure in which the top and/or the bottom of the pack case comprises two or more continuous inclined surfaces.

15. The battery pack according to claim 14, wherein the top of the pack case is configured to have a structure in which a distance between the top of the pack case and a top of the battery module group is decreased toward an end of the pack case opposite to the coolant outlet port.

16. The battery pack according to claim 14, wherein the bottom of the pack case is configured to have a structure in which a distance between the bottom of the pack case and a bottom of the battery module group is decreased toward an end of the pack case opposite to the coolant inlet port.

17. The battery pack according to claim 1, wherein each battery module comprises 8 to 24 unit cells.

18. The battery pack according to claim 1, wherein the unit cells are spaced apart from each other by a size equivalent to 5 to 50% a thickness of each unit cell.

19. The battery pack according to claim 1, wherein each unit module comprises two or more battery cells, electrode terminals of which are connected in series to each other, and a pair of cell covers coupled to cover outsides of the battery cells excluding the electrode terminals of the battery cells.

20. The battery pack according to claim 1, wherein each battery cell is configured to have a structure in which an electrode assembly is mounted in a pouch-shaped case comprising a resin layer and a metal layer.

21. The battery pack according to claim 1, wherein each battery cell is a lithium secondary battery.

22. The battery pack according to claim 1, wherein the coolant is air.

23. An electric vehicle, a hybrid electric vehicle, a plug-in hybrid electric vehicle, or a power storage device using a battery pack according claim 1 as a power source.

24. A battery pack comprising battery cells or unit modules (unit cells) that can be charged and discharged, wherein the battery pack is configured to have a structure comprising:

a battery module group comprising one or more battery modules each having the unit cells mounted in a pack case in a state in which the unit cells are uprightly arranged in a width direction (lateral direction) of the battery pack such that the unit cells are spaced apart from each other by a spacing distance for coolant flow;

a coolant introduction part, as a flow space extending from a coolant inlet port to the battery module group, continuously defined in a space between a bottom of the pack case and the battery module group;

a coolant discharge part, as a flow space extending from the battery module group to a coolant outlet port, defined in a space between a top of the pack case and the battery module group;

a battery management system (BMS) located at one side of the battery module group, the BMS being mounted in an inner space defined by the coolant discharge part; and a coolant flow channel defined between the coolant introduction part and the coolant discharge part, the coolant flow channel being configured such that coolant introduced through the coolant inlet port cools the respective unit cells while passing through the respective unit cells and some of the coolant having passed through the respective unit cells cools the BMS in an eddy form and is then discharged out of the battery pack through the coolant outlet port, wherein the BMS is located at an angle of 20 to 70 degrees to a direction in which the coolant flows from the coolant introduction part to the unit cells, and wherein at least one communication port for coolant flow is defined between the BMS and a corresponding one of the unit cells.

* * * * *